United States Patent
Heidenreich et al.

(10) Patent No.: US 8,147,206 B2
(45) Date of Patent: Apr. 3, 2012

(54) JET VANE AND METHOD FOR MANUFACTURING A JET VANE

(75) Inventors: Bernhard Heidenreich, Asperg (DE); Christian Zuber, Berglen (DE)

(73) Assignee: Deutsches Zentrum fuer Luft-und Raumfahrt e.V., Cologne (DE)

( * ) Notice: Subject to any disclaimer, the term of this patent is extended or adjusted under 35 U.S.C. 154(b) by 1392 days.

(21) Appl. No.: 11/655,784

(22) Filed: Jan. 18, 2007

(65) Prior Publication Data
US 2010/0272577 A1 Oct. 28, 2010

Related U.S. Application Data

(63) Continuation of application No. PCT/EP2005/007761, filed on Jul. 16, 2005.

(30) Foreign Application Priority Data

Jul. 27, 2004 (DE) .......................... 10 2004 037 487

(51) Int. Cl.
*F01D 5/14* (2006.01)
*F01D 5/28* (2006.01)
*B29C 70/00* (2006.01)
*B29C 70/06* (2006.01)

(52) U.S. Cl. .................. 416/230; 416/241 B; 29/889.71

(58) Field of Classification Search .............. 416/223 R, 416/229 A, 223 A, 229 R, 230, 241 R, 241 A, 416/241 B; 60/201, 230; 29/889, 71
See application file for complete search history.

(56) References Cited

U.S. PATENT DOCUMENTS

| | | | |
|---|---|---|---|
| 5,112,008 A * | 5/1992 | Pahnke et al. | 244/3.24 |
| 5,380,475 A | 1/1995 | Goedtke et al. | |
| 5,454,693 A * | 10/1995 | Aubry et al. | 416/134 A |
| 6,151,887 A | 11/2000 | Haidn et al. | |
| 6,182,442 B1 | 2/2001 | Schmidt et al. | |
| 6,460,807 B1 | 10/2002 | Braitinger et al. | |
| 2002/0130216 A1 | 9/2002 | Facciano et al. | |

FOREIGN PATENT DOCUMENTS

| | | |
|---|---|---|
| DE | 196 32 893 | 2/1998 |
| DE | 10 2004 008 452 | 9/2005 |
| DE | 10 2004 022 358 | 11/2005 |
| EP | 0 744 591 | 11/1996 |

* cited by examiner

*Primary Examiner* — Edward Look
*Assistant Examiner* — Jesse Prager
(74) *Attorney, Agent, or Firm* — Lipsitz & McAllister, LLC

(57) ABSTRACT

A jet vane for use in streams of hot gas, comprising a wing having a core area and a cover skin area surrounding the core area, is proposed. The cover skin area is made of a fiber-reinforced material, and the fibers in the cover skin area are oriented substantially parallel to the wing surface, and/or the cover skin area is made of a fiber-reinforced material that is reinforced with short fibers.

52 Claims, 6 Drawing Sheets

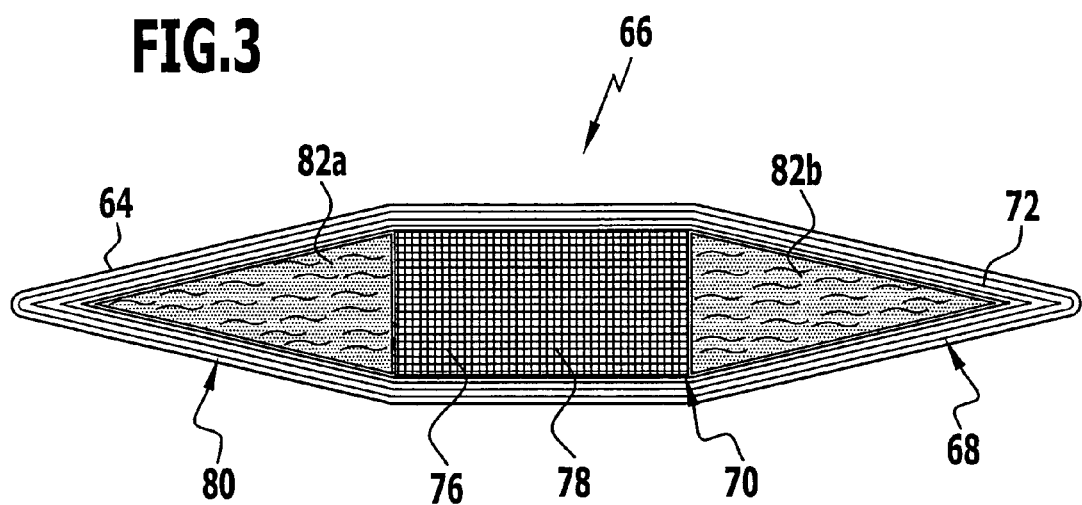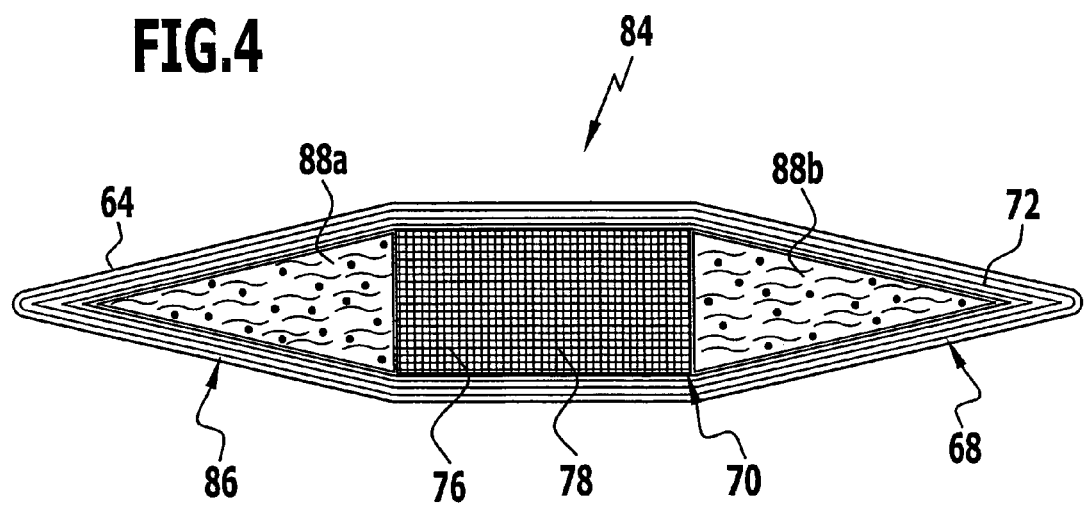

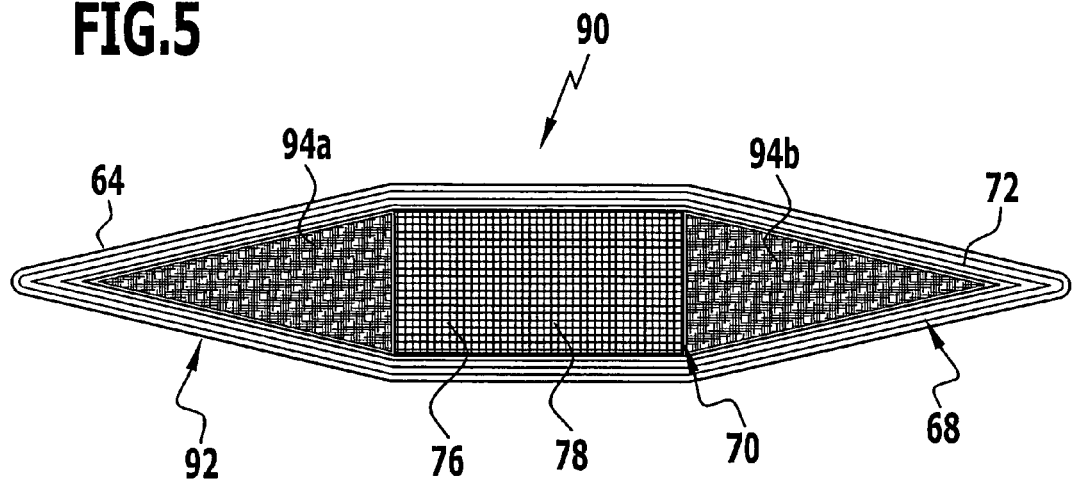
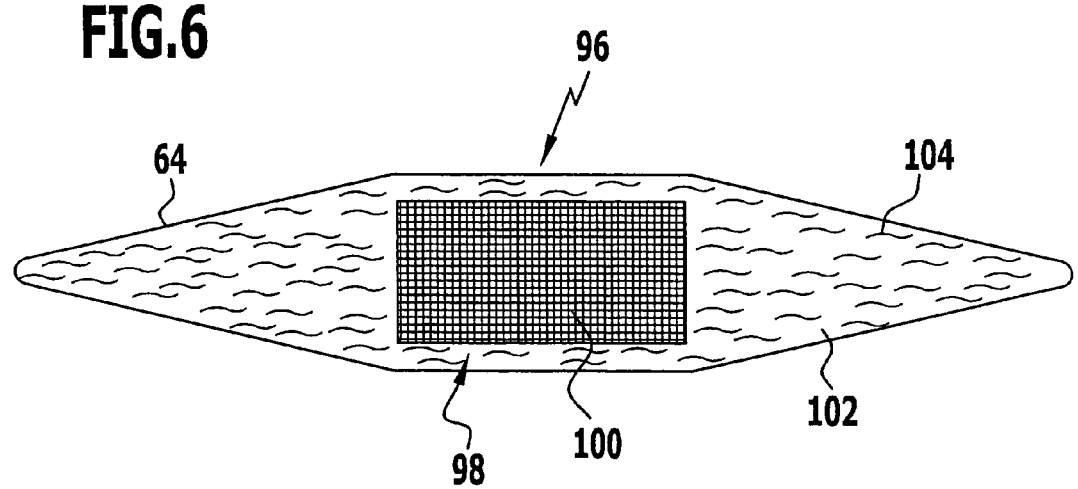

JET VANE AND METHOD FOR MANUFACTURING A JET VANE

This application is a continuation of international application number PCT/EP2005/007761 filed on Jul. 16, 2005.

The present disclosure relates to the subject matter disclosed in international application number PCT/EP2005/007761 of Jul. 16, 2005 and German application number 10 2004 037 487.2 of Jul. 27, 2004, which are incorporated herein by reference in their entirety and for all purposes.

BACKGROUND OF THE INVENTION

The invention relates to a jet vane for use in streams of hot gas.

The invention also relates to a method for manufacturing a jet vane from a material that is fiber-reinforced at least in partial areas thereof.

A missile with jet vanes consisting of carbon fiber-reinforced silicon carbide and/or carbon fiber-reinforced carbon and/or silicon carbide fiber-reinforced silicon carbide is known from DE 196 32 893 A1.

Jet vanes are also referred to as jet flaps or jetavators. They are arranged in the proximity of an exit end of a nozzle, in particular, of an airborne device and serve to influence the stream of hot gas immediately before it exits, in order to thereby steer the airborne device.

In particular, when solid fuels are used, jet vanes may be exposed not only to hot gases but also to corrosive and/or abrasive particles.

SUMMARY OF THE INVENTION

In accordance with the present invention, a jet vane having a high resistance to abrasion is provided.

In accordance with an embodiment of the invention, a jet vane for use in streams of hot gas, comprising a wing having a core area and a cover skin area surrounding the core area, is provided, the cover skin area being made of a fiber-reinforced material, and the fibers in the cover skin area being oriented substantially parallel to the wing surface, and/or the cover skin area being made of a fiber-reinforced material that is reinforced with short fibers.

Fiber stumps are prevented from lying at the wing surface by the fibers being oriented substantially parallel to the wing surface. This increases the resistance of the jet vane to abrasion.

A homogeneous fiber distribution in the cover skin area is achieved by using short fibers. The short fibers can also be aligned in a simple way by, for example, pressing during the manufacture. In particular, they can be aligned substantially parallel to the wing surface. Ceramic layers such as SiC layers, which exhibit a very high resistance to abrasion, can thereby be formed at the component surface. Ceramic layers having a very high resistance to abrasion can also be formed at the component surface when long fibers or fabric reinforcements are used.

(Fibers having a length of up to 3 mm are usually understood as short fibers. Fibers which are processed in the form of rovings or fabrics and whose length is dependent on the construction or determined by the geometrical dimensions of the component are referred to as endless fibers. As a rule, long fibers have a fiber length of between 3 mm and 50 mm.)

It is expedient for different areas of the wing that are exposed to different strains to be made from different materials that are adapted to the strains. For example, an area that forms a wing surface is exposed to high corrosive and/or abrasive strain in a stream of hot gas. A shaft is exposed to higher mechanical strain. The entire component can be optimized by corresponding adaptation. It is, for example, also possible to use "gradient materials", i.e., materials in which the properties change, for example, in a direction towards the wing surface. For example, the ceramic content can be spatially controlled by corresponding fiber treatment, so that, for example, the ceramic content increases towards the wing surface.

In particular, areas that are corrosively and/or abrasively strained by a stream of hot gas are made of a material with a weaker fiber-matrix bond (in the carbon fiber-reinforced plastic state) in comparison with areas that are exposed to higher mechanical strains. With a weaker fiber-matrix bond, a higher ceramic content can be produced by the ceramization. These areas then have a higher resistance to abrasion. Areas subjected to greater mechanical strain should have a higher bending strength. This is achieved by the ceramic content being set lower. The setting of the ceramic content can be achieved by thermal pretreatment of fibers and, in particular, C fibers or SiC fibers. The resistance to abrasion is further increased by the use of SiC fibers.

For the same reasons, it is also expedient for areas that are corrosively and/or abrasively strained to a greater extent to be made of a material having a higher ceramic content in comparison with areas that are exposed to higher mechanical strains.

It can be provided that the jet vane comprises a shaft which is connected to the wing. The jet vane can be rotatably mounted on a nozzle by means of the shaft. For example, a bolt connection can be established by means of the shaft. The shaft can be integrally connected to the wing or it can be a separate part which is subsequently fixed to the wing.

It is expedient for a shaft continuation area to lie in the core area of the wing. A secure fixing of the shaft to the wing is thereby achieved, with the mechanical load on the wing, which is introduced through the shaft, being optimally divertible.

It is particularly expedient for the shaft to be made of a fiber-reinforced material. In particular, it is made of long fibers which are unidirectional, or it is produced by fabric layers. Mechanical forces can thereby be optimally absorbed.

It is quite particularly advantageous for fibers to be oriented substantially parallel to a longitudinal axis of the shaft. These can be unidirectional (long) fibers or fibers in a fabric.

For the same reason, it is expedient for a shaft continuation area (in the wing) to be made of a fiber-reinforced material and, in particular, to be produced by unidirectional (long) fibers or by a fabric. The shaft and the shaft continuation area can be produced integrally by, for example, using long fibers which extend through both the shaft and the shaft continuation area.

It is then also advantageous for fibers in the shaft continuation area to be oriented substantially parallel to a wing axis.

It has proven expedient for the fibers in the cover skin area to be C fibers (carbon fibers) or SiC fibers.

It is also expedient for the cover skin area to be made of a fiber-reinforced ceramic material, with the fiber-reinforced ceramic material comprising, in particular, C fibers.

In particular, the cover skin area is made of C/C—SiC, i.e., of a silicon carbide ceramic material, which is produced by pyrolysis of a C/C precursor or preform and siliconization. It can also be made of SiC/SiC.

For the same reason, it is expedient for the shaft and/or a shaft continuation area to be made of a material comprising C fibers or SiC fibers.

It is then also expedient for the shaft and/or a shaft continuation area to be made of a fiber-reinforced ceramic material.

In particular, the shaft and/or a shaft continuation area are made of C/C—SiC or SiC/SiC.

It is expedient for the wing to be provided with a coating of hard material such as, for example, boron carbide. The resistance to abrasion is thereby increased. Corresponding jet vanes and coating methods are described in German patent applications No. 10 2004 022 358.0 of Apr. 30, 2004 and No. 10 2004 008 452.1 of Feb. 13, 2004 (U.S. Ser. No. 11/503,512 of Feb. 7, 2005) of the same applicant, which are not previously published.

It can be provided that the core area comprises a shaft continuation area and an intermediate area. In particular, the intermediate area is made of a different material from that of the shaft continuation area. A kind of sandwich structure can thereby be formed with optimized adaptation of the properties.

For example, the intermediate area is made of a fiber-reinforced material that is reinforced with short fibers. The properties of the intermediate area and hence of the jet vane can be set by means of the fiber length of the short fibers. For example, short fibers result in a higher resistance to abrasion, whereas long fibers result in higher strengths. A higher strength is achieved by use of long fibers in the intermediate area.

It is also possible to produce the intermediate area from a monolithic ceramic material. Such a monolithic ceramic material can be produced integrally with the manufacture of the jet vane. Subsequent machining steps are thereby eliminated, and high resistance to abrasion and high rigidity are obtained in the core area.

It can be provided that the cover skin area is produced using fabric layers. These can be laid such that the fibers are aligned parallel to the wing surface.

In particular, the fabric layers surround the core area. Extended setting possibilities for the properties of the jet vane are thereby achieved for optimization of these: different materials can be used for the core area than for the cover skin area.

It is also possible for the cover skin area to be produced by short fibers. A homogeneous distribution of the fibers in the cover skin area is achieved with these. In turn, for example, with C/C—SiC materials, SiC areas are, for example, obtained, which have a high abrasion strength. This, in turn, results in a jet vane with high resistance to abrasion.

In particular, the short fibers are aligned in the cover skin area. They are preferably aligned substantially parallel to the wing surface. Short fibers can be aligned in a simple way by, for example, a pressing operation being carried out in a state in which the short fibers can become aligned.

In accordance with the invention, a method for manufacturing a jet vane made of a material that is fiber-reinforced in at least partial areas thereof, which can be performed in a simple way, is provided.

In accordance with an embodiment of the invention, a jet vane preform with a near net shape is produced by pressing.

When the jet vane preform is manufactured with a near net shape, the subsequent steps for producing the final contour can be minimized. In particular, the forming of the contour in the preform state (for example, on a C/C preform) and on a ceramic body can be minimized. The time and cost expenditure for manufacturing a jet vane preform are reduced accordingly.

Short fibers can also be aligned in a simple way by pressing, so that these are aligned, for example, substantially parallel to a wing surface. In turn, a high resistance to abrasion is thereby obtained.

In addition, there is then no necessity for any cutting operations to be carried out transversely to the longitudinal direction of the fibers. Such cuts result in fiber ends coming into contact with the surface of the component. This, in turn, reduces the resistance of the component to abrasion.

It is thus also possible to use insert cores. For example, pyrolized wooden cores having a certain shape can be used. Furthermore, C/C cores can be used, and different cores can be joined together with, for example, joining paste. The insert cores can be joined by means of a cover skin, with such a cover skin being created as joining means during the pressing. The cover skin is, in turn, preferably fabric-reinforced.

The pressing makes it possible to produce cover skin areas in which fibers are oriented substantially parallel to the wing surface in order to thereby obtain a high resistance to abrasion.

Accordingly, jet vanes with a high resistance to abrasion can be produced with minimized time and cost expenditure by the manufacturing method according to the invention.

In particular, the thus produced jet vane preform is pyrolized and ceramized, for example, by siliconization.

The ceramized jet vane preform can then be at least partially coated with a hard material in order to further increase the resistance to abrasion.

In particular, the pressing is carried out by means of a stamp entering a hollow mold. A jet vane preform with a near net shape can thereby be produced.

It is provided that the hollow mold and/or the stamp are configured in accordance with the final contour of the jet vane to be produced. Subsequent machining steps such as grinding or milling operations are thereby minimized.

In particular, the pressing is carried out under heat, i.e., the pressing operation is a hot pressing operation. A polymer cross linking thus takes place so as to obtain a CFRP (carbon fiber-reinforced plastic) preform. The bond between a core area and a cover skin area can then be improved by, for example, the core area being produced by means of insert cores.

In particular, a stamp and/or a hollow mold is heated.

It can also be provided that a heating operation is carried out on the workpiece after the pressing. The composite obtained by hot pressing is improved by such a tempering operation. It is, however, also possible, in principle, for the hot pressing to be carried out at such a high temperature that subsequent tempering is no longer required.

In particular, a cover skin area and a core area are pressed together by the pressing, with the cover skin area surrounding the core area. A sandwich structure is thereby made, from which the jet vane is then produced by ceramization. In the cover skin area, fibers can be aligned parallel to a wing surface or short fibers employed in a homogeneous distribution. The core area can be homogenized with respect to mechanical stability. In particular, different materials can be used for the core area than for the cover skin area, with these materials being selected in accordance with their function. The core area can also be produced from pyrolized preforms which were machined so as to obtain a certain shape. The corresponding preforms form insert cores which are then joined by means of the cover skins during the pressing.

The cover skin area is advantageously produced by a fiber-reinforced material, with the fibers being oriented parallel to a wing surface of the jet vane. Fiber stumps are thereby prevented from occurring at the wing surface. This increases the resistance of the jet vane to abrasion.

For example, the cover skin area is produced using fabric layers. These are laid out in the hollow mold.

It is also possible for the cover skin area to be produced by a fiber-reinforced material that is reinforced with short fibers. With short fibers (which, in particular, have a length of less than 3 mm), a homogeneous fiber distribution with a defined alignment is achieved in the cover skin area. A high resistance to corrosion is thereby achieved with a ceramic material.

It is also expedient for the shaft to be made of unidirectional fibers or fabric layers. This results in a high bending strength for absorbing corresponding mechanical strains.

In particular, a shaft continuation area is produced in a core area. A secure connection between the shaft and a wing of the jet vane with optimized diversion of forces is thereby achieved.

The shaft continuation area is preferably made of unidirectional fibers or fabric layers. It can be provided that the shaft and the shaft continuation area are integrally produced.

In particular, it is expedient for fibers in the shaft and/or shaft continuation area to be aligned substantially parallel to a longitudinal axis of the shaft.

It can also be provided that an intermediate area is produced in the core area. Different materials can be used than, for example, those in a shaft continuation area and in a cover skin area. The jet vane can then be produced with optimized properties by appropriately selecting the materials.

For example, the intermediate area is made of a fiber-reinforced material that is reinforced with short fibers (or also with long fibers). Short fibers are selected that have such a length that optimized strength of the core area is achieved.

It is also possible for the intermediate area to be made of a monolithic ceramic material. This ceramic material is surrounded by the cover skin area and is, therefore, protected from the outside environment.

It has a high resistance to abrasion. A lack of resistance to thermal shock is therefore irrelevant.

It is quite particularly advantageous for different functional areas of the jet vane to be produced with a material that is adapted to the requirements of the respective functional area. Owing to the provision of a cover skin area, different materials can be used for areas lying underneath the cover skin area.

This results in an increase in the number of possibilities for setting the properties of the jet vane and, in particular, in an improved optimability.

In particular, corresponding requirements for the respective functional areas are set by fiber orientation and/or ceramic content of the corresponding material. For example, the fibers are oriented such that mechanical forces can be absorbed (in the shaft and in the shaft continuation area) in an optimized manner or such that an increased resistance to abrasion (in the cover skin area) prevails owing to the absence of fiber stumps at the wing surface. For example, the ceramic content is set so as to obtain a high resistance to abrasion (in the cover skin area) or an increased bending strength (in the shaft or in the shaft continuation area).

Also, in accordance with an embodiment of the invention, a jet vane is provided for use in streams of hot gas, comprising a wing made of a fiber-reinforced ceramic material, the fiber-reinforced ceramic material being produced by continuous fabric layers, and the material for a core area of the wing having a higher ceramic content than a cover area on either side of the ceramic area.

As a result, an abrasively resistant area or an abrasively resistant layer can be formed in the core area of the wing, and owing to the continuous fabric layers it is possible for this to extend as far as wing edges. A high resistance to abrasion is then also produced there. Furthermore, high mechanical strengths are obtained since the cover areas can be formed accordingly and, in particular, can be configured such that high mechanical strengths prevail in zones subjected to tensile and compressive forces.

In particular, the core area extends as far as into wing edges, or one or more wing edges are formed on the core area. This results in a high abrasion strength at wing edges.

In particular, wing edges located opposite each other are formed on the core area.

It is expedient for the fabric layers to be aligned parallel to at least one area of the wing surface. In this area no fiber stumps come into contact with the surface and, therefore, a high abrasion strength is also thereby achieved.

It is then expedient for the fabric layers to be aligned parallel to the area of the wing surface having the largest surface area.

Such a wing can be produced, for example, from C/C—SiC materials or SiC/SiC materials. In particular, it is provided that a (ceramic) SiC content in the core area is higher than in the cover areas. This results in a high abrasion strength. The cover areas can be optimized with respect to compressive and tensile strength, i.e., optimized with respect to mechanical strength.

It is expedient for the core area to be made of a C/C—SiC-XD material, which has a high abrasion strength.

It is then expedient for the cover areas to be made of a C/C—SiC-XB material and/or a C/C—SiC-XT material. A high mechanical strength is then produced there.

The following description of preferred embodiments serves in conjunction with the drawings to explain the invention in greater detail.

BRIEF DESCRIPTION OF THE DRAWINGS

FIG. 3 shows a schematic cross-sectional view (taken along line A-A in accordance with FIG. 2) of a first embodiment of a jet vane according to the invention;

FIG. 4 shows a schematic cross-sectional view of a second embodiment of a jet vane according to the invention;

FIG. 5 shows a schematic cross-sectional view of a third embodiment of a jet vane according to the invention;

FIG. 6 shows a schematic cross-sectional view of a fourth embodiment of a jet vane according to the invention;

DETAILED DESCRIPTION OF THE INVENTION

Figure 1:
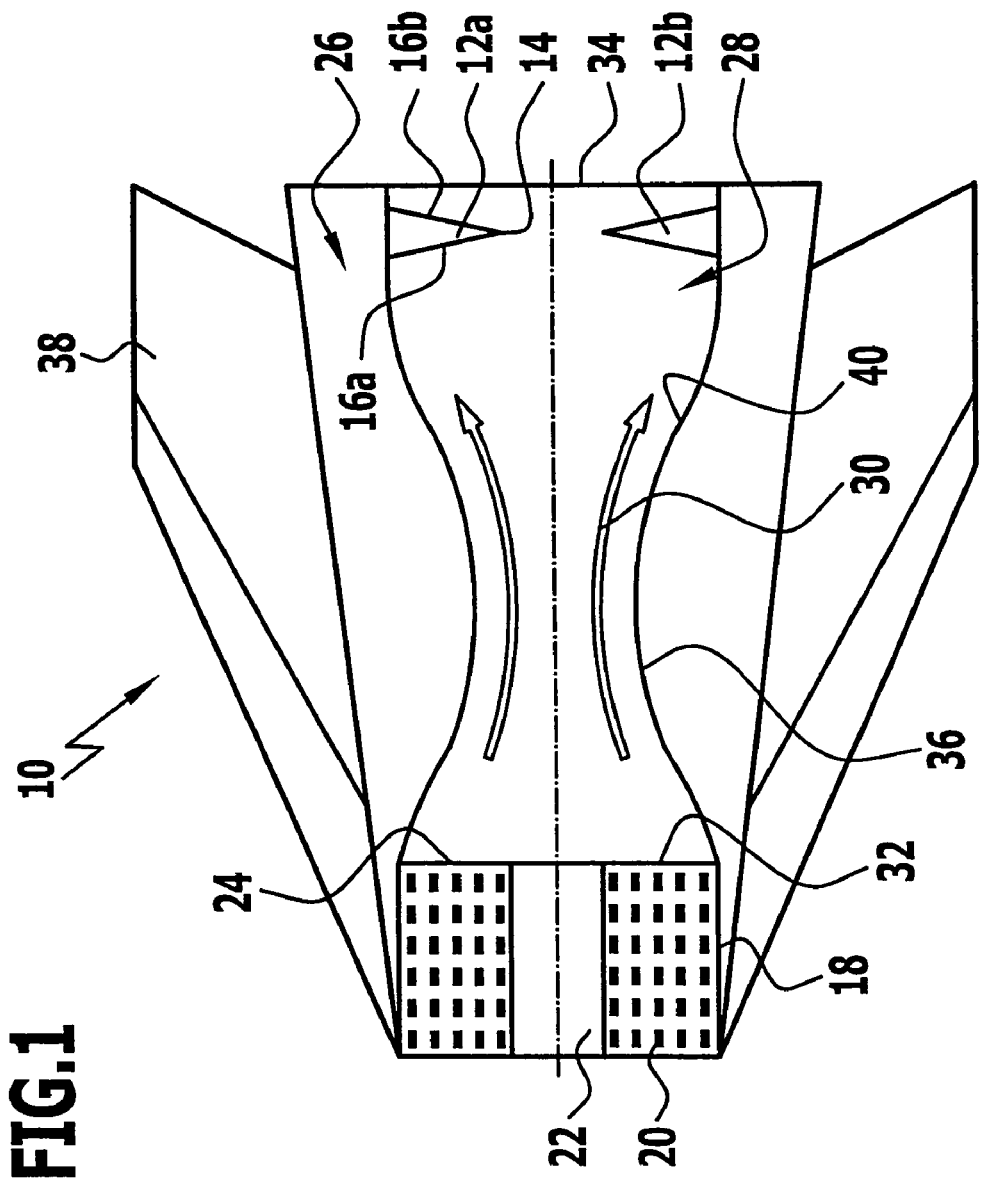
FIG. 1 shows a schematic representation of an embodiment of a flying object with jet vanes.

Jet vanes 12a, 12b are shown in FIG. 1 with reference to an embodiment of an engine 10 (for an airborne device). Such jet vanes 12a, 12b can be made, for example, from a fiber ceramic material, which is coated with a layer of hard material at an edge 14 and at flanks 16a, 16b.

A propellant 20 with a solid fuel is arranged in a housing 18 of the engine 10. The propellant 20 may have a central conduit 22.

A usually rearward end 24 of the housing 18 is followed by a tail cone 26, in which a nozzle 28 is arranged. In operation, a stream of hot gas 30, which forms during combustion of the propellant 20, passes through this nozzle 28. In the area of the end 24, the stream of hot gas 30 exits from the housing 18. The stream of hot gas 30 enters an end 32 of the nozzle 28 at the side thereof on which the propellant is located and passes from an exit end 34 into the environment. The nozzle 28 has a constriction 36 between the end 32 at which the propellant is located and the exit end 34.

The jet vanes 12a, 12b are disposed near the exit end 34 of the nozzle 28. They serve to influence the stream of hot gas 30 immediately before it exits through the exit end 34, in order to steer a flying object equipped with the engine 10.

The tail cone 26 has, for example, additional outer air guides 38 for increasing stability. These are also referred to as fins.

Since the stream of hot gas 30 resulting from the solid propellant 20 contains not only hot gases but owing to combustion of the solid also corrosive and/or abrasive particles, the jet vanes 12a, 12b must be resistant to corrosion and to abrasive particles. For example, the jet vanes 12a, 12b are coated with a hard material such as, for example, boron carbide. An inner wall 40 of the nozzle 28 guiding the stream of hot gas may also be coated with a corresponding hard material.

A jet vane as structural element for withstanding corrosive and/or abrasive streams of hot gas, the structural element comprising a fiber ceramic main body, the main body being formed from a C/C shaped body having a fiber ceramic structure converted with Si to C/C—SiC in a volume region bordering on an upper side of the main body, and a ceramic hard material coating produced by plasma spraying being applied to at least a partial region of the upper side of the main body, is disclosed in German application No. 10 2004 008 452.1 of Feb. 13, 2004 (U.S. Ser. No. 11/503,512 of Feb. 7, 2005) of the same applicant, which is not previously published.

A method for coating a hard material, wherein a hard material coating is applied to a substrate using an induction plasma by plasma spraying is disclosed in German patent application No. 10 2004 022 358.0 of Apr. 30, 2004 of the same applicant, which is not previously published.

Figure 2:
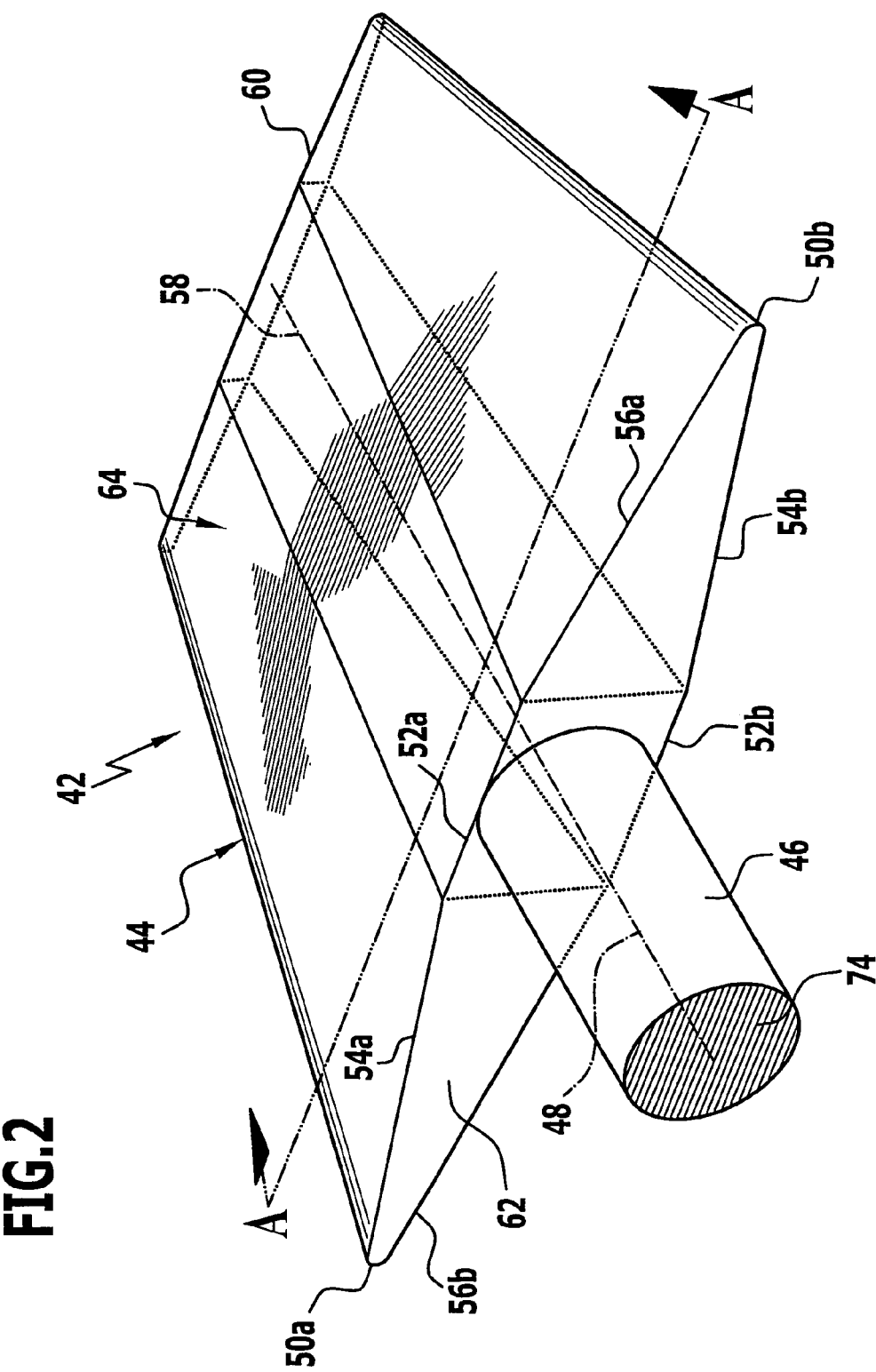
FIG. 2 shows a perspective representation of an embodiment of a jet vane.

An embodiment of a jet vane, which is shown perspectively in FIG. 2 and designated in its entirety 42 therein, comprises a wing 44 and a shaft 46 joined to the wing 44. The wing 44 is exposed to the stream of hot gas 30.

The jet vane 42 is mounted for rotation in the nozzle 28 by means of the shaft 46. The shaft 46 thus serves as fastening bolt for fixing the wing 44 to the nozzle 28.

The shaft 46 is formed, for example, by a cylindrical element, which extends in a longitudinal axis 48 of the shaft.

In the geometry shown by way of example, the wing 44 is profiled with a wing cross section corresponding approximately to an octagon or a hexagon with narrow sides 50a, 50b located in opposite parallel relation to each other and sides 52a, 52b located in opposite parallel relation to each other. The sides 50a and 52a are joined by a side 54a, which extends at an angle to each of these. The sides 50b and 52b are joined by a corresponding side 54b, which is aligned substantially parallel to the side 54a.

In a similar way, the sides 52a and 50b are joined by a side 56a, and the sides 50a and 52b by a side 56b, which is substantially parallel to the side 56a.

In the cross section a wing profile results, which is approximately the combination of a rectangle (formed by the sides 52a and 52b) and two equilateral triangles (with the sides 54a, 56b and 56a, 54b, respectively) with these triangles cut off at the apexes (by the sides 50a, 50b). The bases of these two triangles are sides extending transversely to the sides 52a, 52b.

A wing axis 58 is substantially coaxial with the longitudinal axis 48 of the shaft.

The wing 44 is formed in mirror-symmetrical relation to the wing axis 58. The spacing between the sides 52a, 52b decreases towards a front end 60 (located opposite an end 62 on the shaft side), i.e., the wing 44 tapers in a direction of spacing between the two sides 52a, 52b towards the front end 60.

The spacing between the sides 50a, 50b also decreases towards the front end 60, i.e., in this direction of spacing (which lies transversely to the direction of spacing between the sides 52a and 52b) the wing 44 also tapers towards the front end 60.

A wing surface 64, which is exposed to the stream of hot gas 30, is comprised of the surface areas associated with the sides 52a, 52b, the sides 56a, 54b, the sides 54a, 56b and the sides 50a and 50b, and of the end face at the end 60.

In a first embodiment of a jet vane according to the invention, which is shown in a schematic cross-sectional view in FIG. 3 and designated in its entirety 66 therein, the wing 44 is comprised of a cover skin area 68 and a core area 70. The cover skin area 68 consists of a fiber-reinforced material and, in particular, fiber-reinforced ceramic material. The fibers 72 in the cover skin area 68 are aligned parallel to the wing surface 64. Therefore, no fiber stumps lie at the wing surface 64. The resistance of the jet vane to abrasion is thereby increased.

A typical thickness of the cover skin area 68 lies in the millimeter range.

The fibers 72 of the fiber-reinforced material are, in particular, endless fibers or long fibers. Fibers which are processed in the form of rovings or fabrics and whose length is constructionally determined or determined by the geometrical dimensions of the component are usually referred to as endless fibers. As a rule, long fibers have fiber lengths of between 3 mm and 50 mm. Short fibers are usually understood as fibers with a length of up to 3 mm. If long fibers are used, then with such a length that, as mentioned above, no fiber stumps lie at the wing surface 64.

The cover skin area 68 is made, in particular, of a fiber-reinforced ceramic material such as C/C—SiC or SiC/SiC, with the corresponding ceramic material containing at least one of C fibers and SiC fibers.

It can be provided that the cover skin area 68 is made of a C/C—SiC-XB material or C/C—SiC-XD material.

Different microstructures with different ceramic contents are obtained by using thermally pretreated C fibers. Three material qualities C/C—SiC-XB, XT and XD are differentiated. The microstructure is determined by the strength of the fiber-matrix bond in the CFRP state (state before pyrolization and before ceramization). After the siliconization a strong fiber-matrix bond results in an XB structure which is characterized by dense C/C segments in an SiC matrix. In contrast, a weak fiber-matrix bond results in detachment of the matrix from the fibers. As a result, the complete fiber bundle becomes accessible for the silicon during the ceramization, which results in a relatively brittle fiber-reinforced material with a high ceramic content and a high degree of stiffness. Of the structures XB, XT and XD, this XD structure has the highest modulus of elasticity and owing to the high ceramic content exhibits a particularly high resistance to abrasion. With respect to the microstructure, the XT material lies between the XB material and the XD material. In comparison with the XB material, the XT material has an increased damage tolerance and higher failure tensions.

C/C—SiC composite materials, known under the designation XB, XD and XT, are described in the article "Principles And New Aspects in LSI-Processing" by J. Fabig, W. Krenkel, Tagungsband 9$^{th}$ CIMTEC, Florence, Jun. 14 to 19, 1998. Reference is made to this article.

A high resistance to abrasion is obtained by the alignment of the fibers 72 parallel to the wing surface 64 and use of the material XB or XT.

The shaft 46 is also made of a fiber-reinforced material and, in particular, fiber-reinforced ceramic material such as C/C—SiC. As indicated in FIG. 2, it is produced by fabric layers 74 or unidirectional long fibers aligned substantially parallel to the longitudinal axis 48 of the shaft.

A preferred material for the shaft 46 is XT or XB, which exhibits high strength and resistance to bending. (The material XT has a higher strength than XB, but a lower resistance to abrasion.)

The core area 70 comprises a shaft continuation area 76 in the wing 44. The shaft continuation area 76 is made in substantially the same way as the shaft 46, i.e., preferably using fabric layers 78 (FIG. 3) or unidirectional (long or endless) fibers. In particular, XT is used as material.

In the embodiment shown in FIG. 3, the shaft continuation area 76 is of rectangular cross section, with this rectangular area tapering towards the end 60.

The fabric layers 78 or unidirectional fibers are aligned parallel to the longitudinal axis 48 of the shaft.

The long fibers extend, in particular, continuously through the shaft 46 and the core area 70, i.e., they have a length which corresponds substantially to the spacing between the end 46 and the end of the core area 70 that faces the front end 60 of the wing 44. A reduction in the width of the fibers may prove necessary for forming the profile of the wing 44.

An intermediate area 80 with a first partial intermediate area 82a and a second partial intermediate area 82b is formed on either side of the shaft continuation area 76. These partial intermediate areas 82a, 82b are made, for example, by a ceramic material reinforced with short fibers. The short fibers are, in particular, C short fibers. A possible fiber-reinforced ceramic material is XB or XD.

It is also possible for different materials to be used for the intermediate area 80. For example, in an area located closer to the shaft 46, the intermediate area 80 may be made of a fiber-reinforced material with a higher bending strength such as XB, and, in an area located towards the end 60, of a fiber-reinforced material with greater resistance to abrasion such as, for example, XD.

In a second embodiment of a jet vane, shown schematically in a cross-sectional representation in FIG. 4 and designated 84 in its entirety therein, an intermediate area 86 has partial intermediate areas 88a and 88b. The intermediate area 86 is made of a fiber-reinforced material based on short fibers and, in particular, C short fibers, and containing additives such as SiC and/or $B_4C$. Otherwise the jet vane 84 is identical in construction to the jet vane 66. Therefore, identical reference numerals are used for identical elements. The partial intermediate areas 88a and 88b may also be made of different materials.

In a third embodiment, shown schematically in a cross-sectional representation in FIG. 5 and designated 90 in its entirety therein, an intermediate area 92 is provided, which comprises a first partial intermediate area 94a and a second partial intermediate area 94b. The two partial intermediate areas 94a, 94b are each arranged at a side of the core area 70. (For elements identical with those of the embodiment 66 in accordance with FIG. 3 identical reference numerals are used.) The partial intermediate areas 94a, 94b are made of a monolithic ceramic material such as, for example, a biomorphic ceramic material. For example, the intermediate area 92 is produced using a pyrolized preform or a green compact such as, for example, a corresponding wooden body. This is transformed into a monolithic ceramic material by the siliconization. Otherwise the jet vane in accordance with the third embodiment 90 is identical in construction to the jet vane 66.

Again, unidirectional long fibers in the core area 70 are oriented along the wing axis 58 or fabric layers are oriented during the manufacture along the wing axis 58.

In a fourth embodiment, shown schematically in FIG. 6 and designated 96 in its entirety therein, a core area 100 made of unidirectional fibers or fabric layers is provided as inner area 98. This core area 100 is surrounded without any intermediate area by a cover skin area 102. This cover skin area 102 is made of a fiber-reinforced material reinforced with short fibers such as, for example, XD. The C short fibers (indicated by reference numeral 104 in FIG. 6) are preferably aligned so as to at least not meet the wing surface 66 at an acute angle. In principle, they may also be aligned at least approximately parallel to the wing surface 66.

Figure 7:
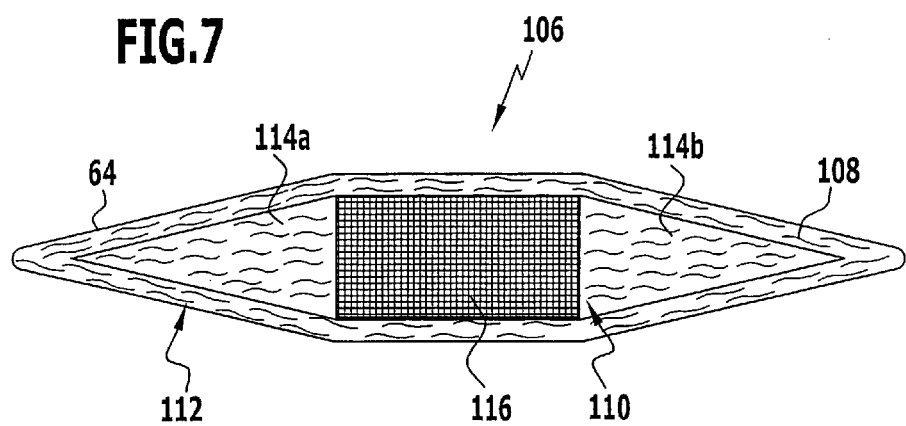
FIG. 7 shows a schematic cross-sectional view of a fifth embodiment of a jet vane according to the invention.

In a fifth embodiment, shown schematically in a cross-sectional representation in FIG. 7 and designated 106 in its entirety therein, a cover skin area 108 surrounds a core area 110. The core area 110 comprises an intermediate area 112 with partial intermediate areas 114a and 114b which are each arranged at a side of a shaft continuation area 116. The partial intermediate areas 114a, 114b each border at one side on the shaft continuation area 116, and the cover skin area 108 surrounds the partial intermediate areas 114a, 114b and the shaft continuation area 116.

The cover skin area 108 is made of a fiber-reinforced material made with short fibers and, in particular, C short fibers and having, for example, an XD microstructure. The length of the short fibers is, in particular, less than 3 mm, and these are aligned so as to at least not meet the wing surface 66 at an acute angle.

The shaft continuation area 116 is produced with unidirectional fibers (aligned parallel to the wing axis 58) or fabric layers.

The intermediate area 112 is made of a short-fiber-reinforced material reinforced with C short fibers, such as XB or XD.

In jet vanes 66, 84, 90, 96, 106 the wing surface 64 is formed by the corresponding cover skin areas 68, 102 and 108, respectively. A coating of hard material, for which, for example, boron carbide is used as hard material, may be provided on these cover skin areas 68, 102, 108. In this connection, reference is made to German patent applications No. 10 2004 008 452.1 of Feb. 13, 2004 (U.S. Ser. No. 11/503,512 of Feb. 7, 2005) and No. 10 2004 022 358.0 of Apr. 30, 2004 of the same applicant, which are not previously published.

In the method according to the invention for manufacturing a jet vane 42, a jet vane preform with a near net shape is produced by pressing.

Figure 8:
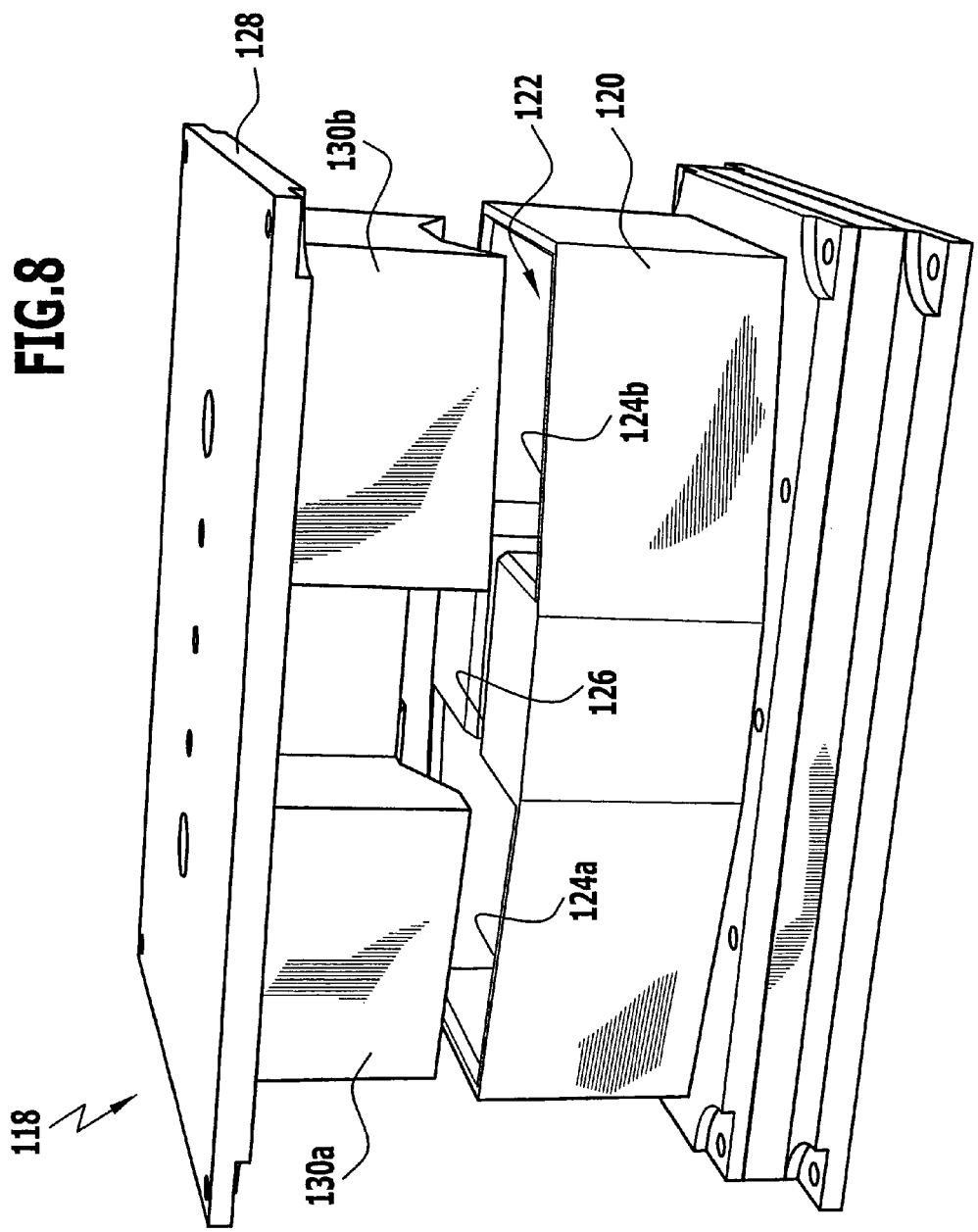
FIG. 8 shows a schematic perspective view of an apparatus for manufacturing a jet vane according to the invention.

An embodiment of a corresponding pressing apparatus 118 is shown schematically in FIG. 8. The pressing apparatus 118 comprises a hollow mold 120 which is heatable. The hollow mold 120 comprises a receiving compartment 122 for one or more workpieces. In the embodiment shown in FIG. 8, the receiving compartment 122 comprises a first sub-compartment 124a and a second sub-compartment 124b. The sub-compartments 124a, 124b each serve to produce one jet vane preform (pressed with a near net shape), i.e., two jet vane preforms may be produced in one pressing operation.

The sub-compartments 124a, 124b are so designed that the contour of the jet vane 42 may be produced as described above.

A compartment 126 for accommodating the respective shaft 46 of the jet vane preform to be produced lies between the sub-compartments 124a, 124b.

The pressing apparatus 118 also comprises a stamp device 128 with a first stamp component 130a and a second stamp component 130b. The first stamp component 130a enters the sub-compartment 124a, and the second stamp component 130b enters the sub-compartment 124b. Both stamp components 130a and 130b are heatable. Their contours are adapted to the sub-compartments 124a, 124b and to the surface shape of the jet vane preform that is to be produced with a near net shape.

The workpieces to be pressed are positioned in a kind of sandwich structure in the hollow mold 120. For example, the corresponding fabric layers for the cover skin area 68 with fabric layers 74 located therebetween for the shaft continuation area 76 and the shaft 46, and the material for the intermediate area 80 are positioned therein. The fabric layers for the cover skin area 68 are so aligned that the fibers are parallel to the wing surface 64.

With heated stamps 130a, 130b and heated hollow mold 120, a pressing operation is then carried out, in which the cover skin area is pressed together with the core area. A typical order of magnitude for the pressure applied during the pressing is about 46 bar.

The temperature of the hollow mold 120 and the stamp device 128 during the pressing is, for example, approximately 180° C. Higher temperatures are also possible.

The component produced by carrying out the pressing operation at 180° C. (the jet vane preform produced with a near net shape) was tempered after the pressing.

The jet vane preform can be produced with a near net shape by the hot pressing in the pressing apparatus 118, so that a subsequent milling with the creation of fiber stumps at the wing surface 64 is, at the most, necessary to a limited extent. The jet vane preform thus produced with a near net shape is then ceramized by a pyrolysis first being carried out and subsequently a siliconization. For example, the LSI process may be used for the siliconization. A coating of hard material may also be applied to the thus produced component, for example, by spraying-on, by means of an induction plasma, as described in German application No. 10 2004 022 358.0 of Apr. 30, 2004. Coating by means of CVD or EB-PVD is also possible.

The manufacturing costs are lowered and the manufacturing time is reduced by the method according to the invention. The mechanical machining operations for producing the final contour of the jet vane are reduced by producing the jet vane preform (which, in particular, is a CFRP preform) with a near net shape.

In accordance with the invention, it is possible to use various materials with their corresponding properties adapted to the requirements of certain areas of the jet vane. For example, C short fibers, C long fibers and C fabric layers can be combined. The optimized material is used in accordance with the mechanical and abrasive strain on the respective area of the jet vane to be manufactured.

This then results in a jet vane which is optimized for the mechanical strains and the abrasive strains. In particular, the optimization is achieved by fiber orientation and appropriate choice of material, in particular, with respect to the ceramic content.

The resistance to abrasion is improved by the fibers in the cover skin areas being oriented parallel to the wing surface 64 and thus not being cut into. In particular, in the cover skin area a fiber-reinforced material with a high ceramic component is used such as, for example, XD, which contributes towards further improving the resistance to abrasion.

A core made of a monolithic ceramic material without fiber reinforcement may, for example, also be used. Monolithic ceramic components are not damage-tolerant with respect to hot gas corrosion. Nor are they resistant to thermal shocks. They have a pronounced brittle fracture behavior. In the solution according to the invention, such a monolithic ceramic core is surrounded by the fiber-reinforced cover skin area and, therefore, is protected. Such a monolithic ceramic area can be integrally produced during the manufacture, so that, in particular, no additional machining or adaptation is required.

Owing to different coefficients of thermal expansion of monolithic ceramic materials and C/C—SiC materials of the cover skin areas, cracks occur in the monolithic ceramic material during the cooling down in the siliconization process. The ceramic material breaks up into small parts. The resistance to thermal shocks is thereby increased. In the event of thermal shock (during use of the jet vane) the ceramic parts may, in turn, break additionally. However, the parts are held or prevented from flying away by the cover skin area.

Short fibers and, in particular, C short fibers may be used. This results in a homogeneous fiber distribution in the cover skin area of the jet vane. SiC layers, having a very high resistance to abrasion, may thus form at the component surface.

With short fibers, it is, in particular, then also possible to use different fiber lengths. Short fibers give rise to high resistance to abrasion and are preferably used in areas near the surface. Longer fibers result in higher strengths and are preferably used in the core area of the jet vane.

When using fabric layers, these may be used in a 0°/90° fiber orientation or in a 0°/90° and ±45° fiber orientation.

Figure 9:
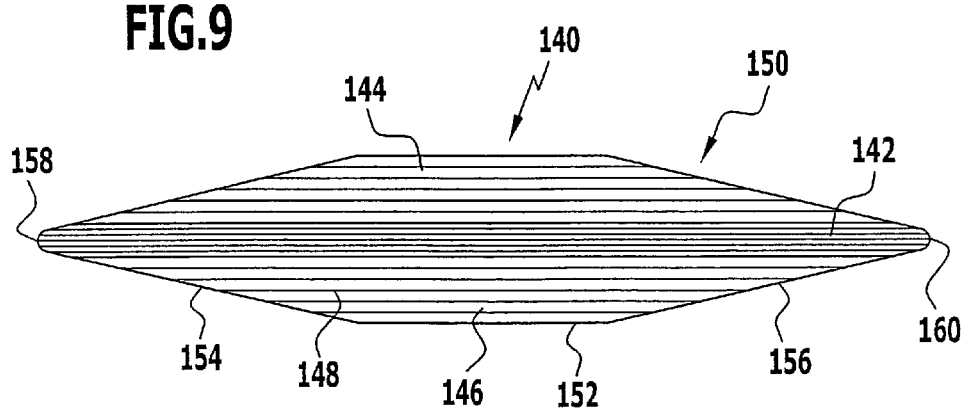
FIG. 9 shows a schematic cross-sectional view of a further embodiment of a jet vane according to the invention.

A further embodiment of a jet vane according to the invention is shown schematically in a cross-sectional representation in FIG. 9 and designated 140 in its entirety therein. This jet vane 140 comprises a core area 142 with a cover area 144, 146 lying on either side thereof. The core area and the cover areas 144, 146 are made of materials having different properties.

The jet vane 140 is made of a fiber-reinforced ceramic material. Continuous fabric layers 148 are used for the manufacture.

The jet vane 140 comprises a wing 150 on which a shaft (not shown in FIG. 9) is seated. The wing comprises a wing surface with different areas. The fabric layers 148 are preferably aligned parallel to a surface area 152 having in comparison with adjacent surface areas 154, 156 the largest area.

Edges 158, 160 of the wing 150 located opposite each other are formed on the core area 142, i.e., the core area 142 extends as far as into these edges 158, 160.

The fabric layers 148 with the fibers are pretreated so as to produce a higher ceramic content in the core area 142 than in the cover areas 144 and 146. In particular, an SiC content (set by thermal pretreatment of the corresponding fabric layers) is higher in the core area 142 than in the cover areas 144, 146. Therefore, the material forming the edges 158, 160 also has a correspondingly high ceramic content.

For example, the core area 142 is made of a C/C—SiC-XD material. The cover areas 144, 146 are made of a C/C—SiC-XT material or a C/C—SiC-XB material.

For example, the wing 150 is manufactured using a plate produced by laying fabric layers 148 and subsequent pyrolization and ceramization. The wing 150 is then made from this plate by machining, for example, milling and sawing, the material.

The invention claimed is:

1. Jet vane for use in streams of hot gas, comprising:
a wing having a core area and a cover skin area completely surrounding said core area;
wherein:
said cover skin area is made of a fiber-reinforced ceramic material;
at least one of: (a) fibers in said cover skin area are oriented substantially parallel to a wing surface; and (b) said cover skin area is made of a fiber-reinforced material that is reinforced with short fibers;
different areas of the wing that are exposed to different strains are made from different materials that are adapted to the strains; and
said cover skin area, which is at least one of corrosively and abrasively strained to a greater extent by a stream of hot gas, is made of a material with a higher ceramic content in comparison to a material of the core area which is exposed to higher mechanical strains.

2. Jet vane in accordance with claim 1, wherein said cover skin area is made of a material with a weaker fiber-matrix bond in a carbon fiber-reinforced plastic state in comparison with the core area.

3. Jet vane in accordance with claim 1, wherein a shaft is connected to the wing.

4. Jet vane in accordance with claim 3, wherein a shaft continuation area is located in the core area of the wing.

5. Jet vane in accordance with claim 4, wherein the shaft continuation area is formed substantially symmetrically in relation to a wing axis.

6. Jet vane in accordance with claim 3, wherein the shaft is made of a fiber-reinforced material.

7. Jet vane in accordance with claim 6, wherein fibers of the fiber-reinforced material of the shaft are oriented substantially parallel to a longitudinal axis of the shaft.

8. Jet vane in accordance with claim 6, wherein a shaft continuation area is made of a fiber-reinforced material.

9. Jet vane in accordance with claim 8, wherein fibers in the shaft continuation area are oriented substantially parallel to a wing axis.

10. Jet vane in accordance with claim 1, wherein the fibers in the cover skin area are C fibers or SiC fibers.

11. Jet vane in accordance with claim 1, wherein the cover skin area is made of C/C—SiC or SiC/SiC.

12. Jet vane in accordance with claim 3, wherein at least one of the shaft and a shaft continuation area is made of a material comprising C fibers or SiC fibers.

13. Jet vane in accordance with claim 3, wherein at least one of the shaft and a shaft continuation area is made of a fiber-reinforced ceramic material.

14. Jet vane in accordance with claim 3, wherein at least one of the shaft and a shaft continuation area is made of C/C—SiC or SiC/SiC.

15. Jet vane in accordance with claim 1, wherein at least one of the wing and a shaft is provided with a coating of hard material.

16. Jet vane in accordance with claim 1, wherein the core area comprises a shaft continuation area and an intermediate area.

17. Jet vane in accordance with claim 16, wherein the intermediate area comprises a material reinforced with short fibers.

18. Jet vane in accordance with claim 16, wherein the intermediate area is made of a monolithic ceramic material.

19. Jet vane in accordance with claim 1, wherein the cover skin area is produced using fabric layers.

20. Jet vane in accordance with claim 19, wherein the fabric layers surround the core area.

21. Jet vane in accordance with claim 1, wherein the cover skin area is produced by short fibers.

22. Jet vane in accordance with claim 21, wherein the short fibers are aligned.

23. Jet vane in accordance with claim 21, wherein the short fibers are aligned substantially parallel to the wing surface.

24. Method for manufacturing a jet vane made of a material that is fiber-reinforced in at least partial areas thereof, comprising:
producing a jet vane preform with a near net shape by pressing;
said jet vane comprising:
a wing having a core area and a cover skin area completely surrounding said core area, wherein:
said cover skin area is made of a fiber-reinforced ceramic material;
at least one of: (a) fibers in said cover skin area are oriented substantially parallel to a wing surface; and (b) said cover skin area is made of a fiber-reinforced material that is reinforced with short fibers;
different areas of the wing that are exposed to different strains are made from different materials that are adapted to the strains; and
said cover skin area, which is at least one of corrosively and abrasively strained to a greater extent by a stream of hot gas, is made of a material with a higher ceramic content in comparison to a material of the core area which is exposed to higher mechanical strains.

25. Method in accordance with claim 24, wherein the thus produced jet vane preform is pyrolyzed.

26. Method in accordance with claim 24, wherein the thus produced jet vane preform is ceramized.

27. Method in accordance with claim 26, wherein the ceramized jet vane preform is at least partially coated with a layer of hard material.

28. Method in accordance with claim 24, wherein the pressing is carried out by means of a stamp entering a hollow mold.

29. Method in accordance with claim 28, wherein at least one of the hollow mold and the stamp is configured to correspond to a final shape of the jet vane to be produced.

30. Method in accordance with claim 24, wherein the pressing is carried out while heat is supplied.

31. Method in accordance with claim 30, wherein a stamp is heated.

32. Method in accordance with claim 30, wherein a hollow mold is heated.

33. Method in accordance with claim 24, wherein a heating operation is carried out on a workpiece after the pressing.

34. Method in accordance with claim 24, wherein the cover skin area and the core area are pressed together during the pressing.

35. Method in accordance with claim 24, wherein the cover skin area is produced using fabric layers.

36. Method in accordance with claim 24, wherein a shaft is made of unidirectional fibers or fabric layers.

37. Method in accordance with claim 36, wherein a shaft continuation area is produced in the core area.

38. Method in accordance with claim 37, wherein the shaft continuation area is made of unidirectional fibers or fabric layers.

39. Method in accordance with claim 36, wherein fibers in at least one of the shaft and a shaft continuation area are aligned substantially parallel to a longitudinal axis of the shaft.

40. Method in accordance with claim 34, wherein an intermediate area is produced in the core area.

41. Method in accordance with claim 40, wherein the intermediate area is made of a fiber-reinforced material that is reinforced with short fibers.

42. Method in accordance with claim 40, wherein the intermediate area is made of a monolithic ceramic material.

43. Method in accordance with claim 24, wherein different functional areas of the jet vane are produced with a material that is adapted to requirements of the respective functional area.

44. Method in accordance with claim 43, wherein at least one of fiber orientation and ceramic content of the corresponding material is set in accordance with the requirements for the respective functional area.

45. Jet vane for use in streams of hot gas, comprising:
a wing made of a fiber-reinforced ceramic material;
wherein:
said fiber-reinforced ceramic material is produced by continuous fabric layers;
the material for a core area of the wing has a higher ceramic content than a cover area on either side of said core area; and
the core area extends as far as into wing edges.

46. Jet vane for use in streams of hot gas, comprising:
a wing made of a fiber-reinforced ceramic material;
wherein:
said fiber-reinforced ceramic material is produced by continuous fabric layers;
the material for a core area of the wing has a higher ceramic content than a cover area on either side of said core area; and
one or more wing edges are formed on the core area.

47. Jet vane in accordance with claim 46, wherein wing edges located opposite each other are formed on the core area.

48. Jet vane in accordance with claim 45, wherein the fabric layers are aligned parallel to at least one area of the wing surface.

49. Jet vane in accordance with claim 48, wherein the fabric layers are aligned parallel to an area of the wing surface having a largest surface area.

50. Jet vane in accordance with claim 45, wherein an SiC content in the core area is higher than in the cover areas.

51. Jet vane for use in streams of hot gas, comprising:
a wing made of a fiber-reinforced ceramic material;
wherein:
said fiber-reinforced ceramic material is produced by continuous fabric layers;
the material for a core area of the wing has a higher ceramic content than a cover area on either side of said core area; and
the core area is made of a C/C—SiC-XD material.

52. Jet vane for use in streams of hot gas, comprising:
a wing made of a fiber-reinforced ceramic material;
wherein:
said fiber-reinforced ceramic material is produced by continuous fabric layers;
the material for a core area of the wing has a higher ceramic content than a cover area on either side of said core area; and
the cover areas are made of at least one of a C/C—SiC-XB material and a C/C—SiC-XT material.

* * * * *